United States Patent Office 3,397,316
Patented Aug. 13, 1968

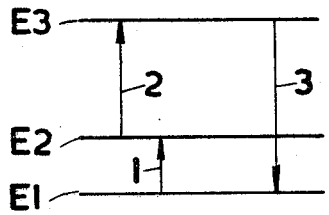
FIG. 1.
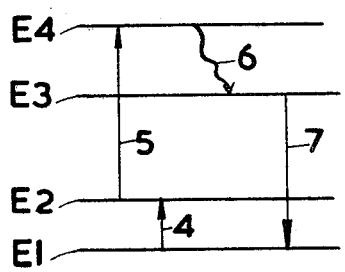
FIG. 2.
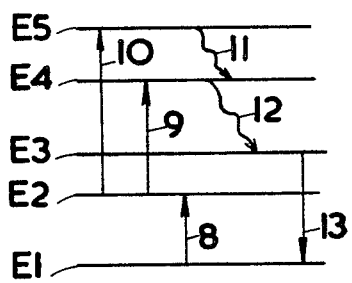
FIG. 3.
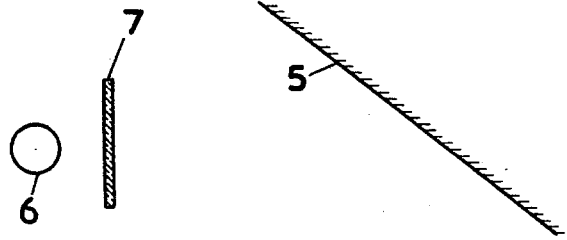
FIG. 7.

3,397,316
OPTICAL FREQUENCY-CHANGING DEVICES AND MATERIALS FOR USE THEREIN
Michael R. Brown, Highcliffe, William Brian Nash, Southbourne, and Geoffrey Phillips, Highcliffe, England, and William A. Shand, Huntly, Scotland, assignors to Minister of Aviation in Her Britannic Majesty's Government of the United Kingdom of Great Britain and Northern Ireland, Strand, London, England
Filed Sept. 18, 1964, Ser. No. 397,403
Claims priority, application Great Britain, Oct. 22, 1963, 41,685/63; Jan. 28, 1964, 3,587/64; Mar. 26, 1964, 12,830/64
24 Claims. (Cl. 250—213)

ABSTRACT OF THE DISCLOSURE

Impurity ions of dysprosium, praseodymium, terbium, erbium holmium or neodymium in a triply ionized state are introduced into a host lattice of one of the fluoride crystals, lanthanum fluoride, calcium fluoride, strontium fluoride or barium fluoride, in concentrations of between one and thirty atomic percent.

Figure 4:
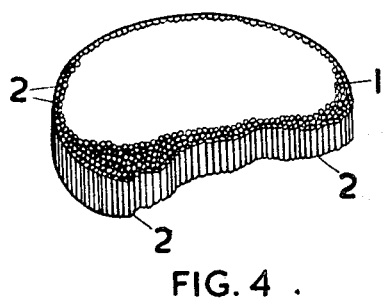

Incident radiations of different specific frequencies raise the energy of the impurity ions from the ground state in at least two stages via one or more separate and distinct intermediate levels to a higher level. In returning to the ground state the electrons give up this energy by emitting radiation at a frequency different to the incident frequencies.

A number of crrystals may be formed into a mosaic or into fibres or pipes to form an image converter in which for example a visible image may be formed from an infra-red image.

Disclosure

The present invention relates to substances suitable for use as electromagnetic optical frequency changing devices which convert incident electromagnetic radiation at one or more frequencies to electromagnetic radiation having a frequency different from that of the incident electromagnetic radiation. Such an optical frequency changing device may be used as an image converter for converting images formed by incident electromagnetic radiation at one or more different frequencies to a corresponding image formed from electromagnetic radiation having a frequency different from that of the incident radiation. For example, an optical frequency changing device may be used to convert an image formed by infrared radiation into the same image formed by visible light.

One known form of substance suitable for use as an electromagnetic optical frequency changing device is a crystalline substance composed of one percent of praseodymium chloride in a host lattice of lanthanum chloride. It has been found that this substance when kept at a temperature of four degrees Kelvin in the presence of incident signal radiation and a pump radiation will emit radiation at a different frequency than that of either of those radiations. The emitted radiation depends upon the presence of the incident signal radiation. However, it is found that even at this low temperature, the signal-to-noise ratio of the emitted radiation is poor. Furthermore, lanthanum chloride is hygroscopic so that the crystal is difficult to preserve. In order to preserve the crystal, it must be coated with a substance impervious to moisture. Also the crystal cracks easily during growth.

It is an object of the present invention to provide a number of relatively stable substances each of which are relatively easy to grow and which can act as an optical frequency changing device to convert incident electromagnetic radiation at one or more frequencies to electromagnetic radiation having a frequency different from that of the incident electromagnetic radiation.

It is a further object of the present invention to provide an image converter for converting an image formed by electromagetic radiation at one or more frequencies to a corresponding image formed from electromagnetic radiation having a frequency different from the incident radiation.

According to the present invention, there is provided a crystal or crystals composed of a host lattice of one of the fluorides lanthanum fluoride, calcium fluoride, strontium fluoride and barium fluoride containing one-half atomic percent to thirty atomic percent of one of the rare earth elements dysprosium, praseodymium, terbium, neodymium, erbium and holmium in the triply ionised state.

According to a feature of the present invention, there is provided an image converter including a plate made from a crystalline substance consisting of a host lattice of one of the fluorides, lanthanum fluoride, calcium fluoride, strontium fluoride and barium fluoride containing 0.1 atomic percent to thirty atomic percent of one of the rare earth elements erbium and holmium in the triply ionised state. The plate may consist of a single crystal plate, a mosaic of small crystals or a bundle of light pipes or fibres made of the crystalline substance and aligned along the shortest dimension of the plate.

Figure 5:
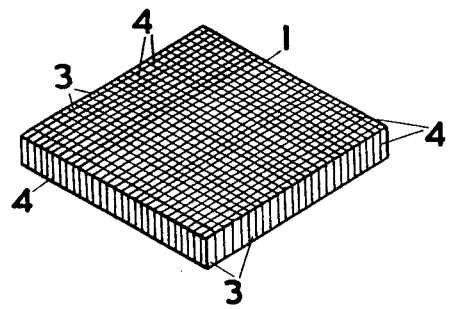
Figure 6:
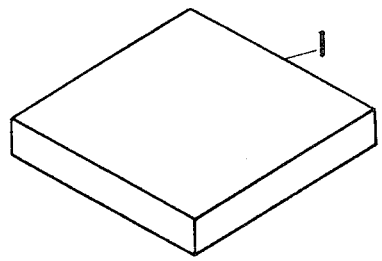

In order that the invention may be more clearly understood, reference will be made to the accompanying drawings, in which:

FIGURE 1 is a diagram illustrating one possible mode of operation of a substance as an optical frequency changing device, FIGURE 2 is a diagram illustrating another possible mode of operation of a substance as an optical frequency changing device, FIGURE 3 is a diagram illustrating yet another possible mode of operation of a substance as an optical frequency changing device, FIGURE 4 is a part sectional diagram of an active element in one form of image converter, FIGURE 5 is a perspective view of another type of active element for an image converter, FIGURE 6 is a perspective view of yet another type of active element for an image converter, and FIGURE 7 is a side elevation view of an image converter.

The principle of operation of a substance according to the invention as an optical frequency changing device is a follows. The host lattice contains a rare earth element as impurity ions which are in the triply ionised state. The electrons in the unfilled shells of the impurity ions are capable of residing in a discrete set of energy states or energy levels. Normally the electrons are in the ground energy level, say $E_1$, but may be excited into higher energy levels, say $E_2$, $E_3$, $E_4$ etc., by various processes; for example, by electromagnetic radiation. Let $N_1$, $N_2$, $N_3$, $N_4$ etc. be the populations of the electrons in the energy levels $E_1$, $E_2$, $E_3$, $E_4$ etc. Let it be assumed that initially all the electrons are in the ground energy level with a population equal to $N_1$ and the numbers of electrons in the excited energy levels are all zero, that is to say, $N_2=N_3=N_4=0$ etc. Incident electromagnetic radiation of a suitable frequency will raise the electrons in the ground energy level to a higher energy level. Pump electromagnetic radiation of a further suitable frequency may then be used to raise electrons in this higher energy level to a still higher energy level. The electrons in this high energy level will relax to a lower energy level and eventually to the ground energy level.

During the relaxation of the electrons between energy levels, electromagnetic radiation is emitted which is of a different frequency from the incident and pump electromagnetic radiations. As is well known to those versed in the art, for a population inversion process, as in the optical maser, to proceed it is necessary that the population of electrons in a higher energy level must be greater than that in the lower energy level to which the transition is proceeding.

As an example of the action of a substance as an optical frequency changing device, there will now be considered in conjunction with FIGURE 1 such a device employing a three energy level system with energy levels $E_1$, $E_2$ and $E_3$ (as shown) having populations $N_1$, $N_2$ and $N_3$ respectively, where 1 refers to the ground energy level, 2 to an intermediate energy level and 3 to the highest energy level. Let it be supposed that there is one source of incident radiation, called the incident signal radiation, of energy $h\nu_{21}$, where $\nu_{21}$ is the frequency and $h$ is Planck's constant, and that $h\nu_{21}=E_2-E_1$, then electrons in the ground energy level $E_1$ will be excited into the energy level $E_2$ as indicated by the arrow 1. The incident signal radiation may, for instance, be infrared radiation. In addition, there is provided a source of pump radiation of energy $h\nu_{32}$, where $\nu_{32}$ is the pump frequency such that $E_3-E_2=h\nu_{32}$. This second source of energy is capable of raising the energy of electrons from the energy level $E_2$ to the energy level $E_3$ as indicated by the arrow 2. The pump radiation may be infrared or visible light. It is possible for electrons in the energy level $E_3$ to lose energy by the process of emission (spontaneous and/or stimulated) to the energy level $E_1$ radiating visible radiation of frequency $\nu_{31}$. This energy change is illustrated by the arrow 3. The electrons are then ready to be again raised to the energy level $E_2$ by the incident signal radiation.

As a further example of the action of an optical frequency changing device, there will now be considered such a device employing a four energy level system with energy levels $E_1$, $E_2$, $E_3$, and $E_4$ having populations $N_1$, $N_2$, $N_3$ and $N_4$ respectively where 1 refers to the ground energy level, 2 and 3 to intermediate energy levels and 4 to the highest energy level. Such a system is illustrated in FIGURE 2. Let it be supposed that there is one source of incident signal radiation of energy $h\nu_{21}$, where $\nu_{21}$ is the frequency and that $h\nu_{21}=E_2-E_1$, then electrons in the ground energy level will be excited into the energy level $E_2$ from the lower energy level $E_1$ as indicated by the arrow 4. This incident image signal may, for instance, be infrared radiation. In addition there is provided a source of pump radiation $h\nu_{42}$, where $\nu_{42}$ is the pump frequency such that $E_4-E_2=h\nu_{42}$. This second source of energy is capable of raising the energy of electrons from the energy level $E_2$ to the energy level $E_4$ as indicated by the arrow 5. This pump radiation may, for instance, be infrared or visible light. The electrons in energy level $E_4$ will relax or decay thermally to the energy level $E_3$, as indicated by the arrow 6. It is possible for electrons in the energy level $E_3$ to lose energy by the process of emission (spontaneous and/or stimulated) to the energy level $E_1$ radiating visible electromagnetic radiation of frequency $\nu_{31}$ which may, for instance, be yellow light. This energy change is illustrated by the arrow 7. The electrons are then ready to be raised again to the energy level $E_2$ by the incident signal radiation.

The upper energy level to which the electrons are raised by pumping may, in fact, comprise a number of closely-spaced energy levels, in which case more efficient pumping can be obtained because the pump radiation will not, in general, contain only one pumping frequency. As an example of this mode of action, a five energy level system will now be described with reference to FIGURE 3. In this case, the energy levels are $E_1$, $E_2$, $E_3$ $E_4$ and $E_5$, $E_1$ being the ground energy level.

Let it be supposed that the incident signal radiation has a frequency $\nu_{21}$ where $h\nu_{21}=E_2-E_1$. Electrons in the ground energy level $E_1$ will then be excited into the energy level $E_2$ as indicated by the arrow 8. In addition, let it be supposed that the pump radiation contains radiation at the two frequencies $\nu_{42}$ and $\nu_{52}$ such that $h\nu_{42}=E_4-E_2$ and $h\nu_{52}=E_5-E_2$, then some of the electrons in the $E_2$ level will be excited into the $E_4$ energy level as indicated by the arrow 9 and some into the $E_5$ energy level as indicated by the arrow 10. The electrons in the $E_5$ energy level will decay thermally to the energy level $E_4$ as indicated by the arrow 11 while those in the $E_4$ energy level will decay thermally to the energy level $E_3$ as indicated by the arrow 12. The electrons thus accumulating in the energy level $E_3$ then lose energy by the process of emission (spontaneous and/or stimulated) to the energy level $E_1$ radiating visible radiation of frequency $\nu_{31}$. This transition is indicated by the arrow 13.

The three modes of operation illustrated in FIGURES 1 to 3 are only examples and many other modes of operation are possible depending upon the substance used. With some substances, a number of modes of operation may occur at the same time so that a number of different image and pump frequencies may be absorbed and a number of differently coloured images may be produced.

Depending on the substance used, the pump frequency may be in the visible spectrum or in the infrared spectrum.

The following rare earth elements present in a concentration of one-half atomic percent to thirty atomic percent in one of the host lattices lanthanum fluoride ($LaF_3$), calcium fluoride ($CaF_2$), strontium fluoride ($SrF_2$) and barium fluoride ($BaF_2$) have been found to be suitable for optical frequency changing. They are: praseodymium, dysprosium, terbium, neodymium, erbium and holmium. Crystals of these substances may be grown by the Stockbarger technique.

The lower percentage limit specified above is set by the minimum percentage required to obtain appreciable optical frequency changing using suitable incident and pump radiations. The upper percentage limit is set by the maximum amount of ion impurity which can in general be introduced into the host lattice without breaking up the host lattice. Within this range, the preferred range of ion impurity is one atomic percent to fifteen atomic percent, this being the range over which the strongest fluorescent transitions have been observed.

The following are some examples of optical frequency changing by crystals of various substances.

*Praseodymium.*—In one mode of operation when praseodymium $3^+$ ions are present in a host lattice of lanthanum fluoride, calcium fluoride, strontium fluoride or barium fluoride, the wavelength of the incident and pump radiation wavelengths are approximately $1.9\mu$ and 572 m$\mu$ whilst the output wavelength is approximately 485 m$\mu$. This phenomenon occurs with a host lattice of barium fluoride at liquid nitrogen temperatures and with the other host lattices at both room temperature and liquid nitrogen temperatures.

*Dysprosium.*—One mode of operation when dysprosium $3^+$ ions are present in a host lattice of lanthanum fluoride, barium fluoride, calcium fluoride or strontium fluoride, at both room temperature and liquid nitrogen temperatures, is a four energy level scheme similar to that illustrated in FIGURE 2. In this mode of operation, the incident and pump radiation wavelengths are approximately $1.69\mu$ and 574 m$\mu$ whilst the output wavelength is approximately 478 m$\mu$.

*Neodymium.*—When present as a $3^+$ impurity ion in one of the host lattices lanthanum fluoride, strontium fluoride, calcium fluoride or barium fluoride, neodymium has several modes of operation, some of which yield a fluorescent output at a wavelength of approximately 412 m$\mu$. However the output light intensity is not strong.

*Terbium.*—Terbium, when present as a $3^+$ ion impurity in the above-mentioned host lattices also exhibits the phenomenon of optical frequency changing. However, the output light intensity is not strong.

In the case of all of the above-mentioned substances containing terbium, praseodymium, dysprosium or neodymium, the output radiation may be detected by means of filters and photocells.

Of all substances which may be used as an optical frequency changing device, those containing triply ionised erbium, or alternatively triply ionised holmium, as an impurity in a concentration of one atomic percent to thirty atomic percent in a host lattice of a fluoride of one of the elements lanthanum, calcium, strontium and barium prove to be by far the most active. For the same intensity of incident signal and pump radiations they provide visible outputs which are of the order of one-hundred times more intense than those given by the other substances set forth above. The following details are given of the behavior of substances containing erbium and holmium.

*Erbium.*—When erbium is present in a host lattice of lanthanum fluoride, strontium fluoride, calcium fluoride or barium fluoride, it has various modes of operation, at room temperature. In these modes, the incident and pump radiation may both be in the near infrared whilst the fluorescent output resulting from the various modes in unison is clearly visible to the eye. The actual colour of the fluorescence depends upon the host lattice. With lanthanum fluoride as host lattice the predominant output is green if the ions are excited to a sufficiently high energy level. Similarly, with strontium fluoride, calcium fluoride and barium fluoride as host lattices the predominant outputs are reddish orange, red and yellowish orange respectively. In some modes of operation, visible radiation is required to raise the energy of the ions from the ground state whilst infrared radiation raises their energy further. This mode of operation may be especially suitable for detecting weak infrared radiation. Modes of operation in which both pump and incident signal radiation are in the near infrared may enable a single broad band source to act both as a source of incident signal radiation and as a source of pump radiation.

Modes of operation conforming to those illustrated in FIGURES 1 and 2 have been observed using erbium as an impurity in a host lattice. In those modes conforming to FIGURE 1, the incident radiation may have a wavelength of approximately 973 m$\mu$ or 1.5$\mu$, the pump radiation may have a wavelength of approximately 1.96$\mu$ or 1.15$\mu$ respectively and the output radiation may have a wavelength of approximately 651 m$\mu$. In those modes conforming to FIGURE 2, the incident radiation may have a wavelength of approximately 651 m$\mu$, 973 m$\mu$ or again 973 m$\mu$, the pump radiation may have a wavelength of approximately 780 m$\mu$, 978 m$\mu$ or 1.13$\mu$ respectively and the output radiation may have a wavelength of approximately 541 m$\mu$.

*Holmium.*—When holmium is present an an impurity ion in a host lattice of lanthanum fluoride, strontium fluoride, calcium fluoride or barium fluoride, it has various modes of operation at room temperature. In one mode of operation, the incident signal radiation and pump radiation have wavelengths of approximately 1.95$\mu$ and 955 m$\mu$ and the fluorescent output has a wavelength of 641$\mu$ (i.e. red). This mode of operation is weak using a host lattice of lanthanum fluoride.

In another mode of operation which is stronger when the host lattice is lanthanum fluoride than when it is one of the other above-mentioned alkaline earth fluorides, the light output is green. In this case, the incident signal radiation and the pump radiation have wavelengths of approximately 1.18$\mu$ and 980 m$\mu$ and the output radiation has a wavelength of approximately 535 m$\mu$. The above two modes of operation conform to the mode illustrated in FIGURE 1.

In a further mode of operation observed when the host lattice is one of the above-mentioned alkaline earth fluorides, the output fluorescence is blue. This mode of operation is illustrated in FIGURE 3 and involves two pump frequencies. It is really two separate modes of operation which both happen to have the same frequencies of incident radiation and output radiation. The incident radiation has a wavelength of approximately 641 m$\mu$, the visible output radiation has a wavelength of approximately 485 m$\mu$ and the pump radiation wavelengths are approximately 753 m$\mu$ and 821 m$\mu$.

In the case of both erbium and holmium, the ion concentrations lie preferably in the range one atomic percent to fifteen atomic percent.

Of the above-mentioned substances, those containing triply ionised impurities of the rare earth erbium or of the rare earth holmium are most suitable for use in an image converter. This is because the substances containing these impurities have a relatively high visual output as hereinbefore mentioned.

The active element of the image converter consists of a plate of a crystalline substance comprising impurity ions of erbium or alternatively holmium present in a 0.1 percent to thirty concentration in a host lattice of a fluoride of one of the elements lanthanum, calcium, strontium and barium. The form of the plate depends on the resolution required of the resulting visible image. If high resolution is required than the plate consists of a bundle of light pipes or light fibres of the substance as illustrated in FIGURE 4. If less resolution is required then the plate may comprise a mosaic of crystal elements of the substance used as illustrated in FIGURE 5. If still less resolution is required, the plate may consist of a single crystal of the substance as illustrated in FIGURE 6.

FIGURE 4 is a part-sectional diagram of a plate forming the active element of an image converter. FIGURE 4 shows a plate 1 made up from a large number of light pipes or fibres some of which are designated by the reference numeral 2. These light pipes each consist of a single fibre of a crystal of the fluoride of one of the elements lanthanum, strontium, calcium and barium containing holmium or erbium. Each of the light pipes or fibres 2 is clad with a material having a lower refractive index than that of the light pipes, such as sodium fluoride or a low refractive index glass, so as to make the light pipes totally internally reflecting for incident signal radiation and output fluorescent radiation.

FIGURE 5 is a perspective view of another form of the plate 1 wherein the plate 1 comprises a mosaic of crystal elements 3. The plate 1 is made by cutting up a single crystal of the substance used, coating four sides of each of the crystal elements so formed with the opaque substance and then cementing the crystal elements together again in their original configuration as illustrated in FIGURE 5. The opaque coating is on the sides of the crystal elements 3 as illustrated by the lines 4, leaving the top and bottom (as shown in the drawing) of the plate 1 free to transmit light.

FIGURE 6 is a perspective view of a plate formed of a single crystal of the substance used.

When the incident signal and pump radiations are obtained from a single broad band source in the near infrared, then the plate 1 of FIGURES 4, 5 or 6 is all that is needed for conversion of an incident signal image to a visible image. In this case, the incident radiations are allowed to fall on one face of the plate 1, when the visible image will be seen in the plate. When, however, the source of incident radiation is weak, it is necessary to use a separate pump source. This may be provided as illustrated in FIGURE 7.

FIGURE 7 is a side elevation view of an arrangement of image converter using a separate pump source. FIGURE 7 shows the plate 1 which may be of any of the forms shown in FIGURES 4, 5 and 6. FIGURE 7 also shows a mirror 5, a source 6 of pump radiation and a filter 7. The filter 7 is provided to transmit infrared radiation but to stop visible light. The infrared radiation transmitted by the filter 7 impinges on the mirror 5 and is reflected on to the upper (as shown in the drawing) surface of the plate 1. The incident image signal is received by the lower (as shown in the drawing) surface of the plate 1. While the mirror 5 is reflecting to the infrared pump radiation it transmits the visible radiation so that the visible image formed by the plate 1 can be detected on the far side of the mirror 5.

We claim:

1. A crystalline substance composed of a host lattice of a fluoride selected from the group consisting of calcium fluoride, strontium fluoride and barium fluoride containing four atomic percent to fifteen atomic percent of impurity ions of erbium.

2. A crystalline substance composed of a host lattice of a fluoride selected from the group consisting of calcium fluoride, strontium fluoride and barium fluoride containing four atomic percent to fifteen atomic percent of impurity ions of holmium.

3. An image converter comprising a plate made from a crystalline substance consisting of a host lattice of one of the fluorides lanthanum fluoride, calcium fluoride, strontium fluoride and barium fluoride containing 0.1 atomic percent to thirty atomic percent of one of the rare earth elements erbium and holmium in the triply ionised state and means for irradiating said crystal with light comprising a first frequency which raises the energy of the electrons of the rare earth element to a higher energy level than their ground level and a second frequency which raises the energy of said electrons to a still higher energy level from which the energy of said electrons falls with the emission of visible light.

4. An image converter as claimed in claim 3 and wherein the said plate comprises a bundle of light pipes or light fibres of the said crystalline substance.

5. An image converter as claimed in claim 3 and wherein the said plate comprises a mosaic of crystal elements of the said crystalline substance.

6. An image converter as claimed in claim 5 and wherein the sides of the crystal elements where they adjoin one another are coated with an opaque substance.

7. An image converter as claimed in claim 3 and wherein the said crystalline substance contains one atomic percent to fifteen atomic percent of erbium.

8. An image converter as claimed in claim 3 and wherein the said plate is a single crystal of the said crystalline substance.

9. An image converter as claimed in claim 8 and wherein the said plate comprises a bundle of light pipes or light fibres of the said crystalline substance.

10. An image converter as claimed in claim 8 and wherein the said plate comprises a mosaic of crystal elements of the said crystalline substance.

11. An image converter as claimed in claim 8 and wherein the said plate comprises a mosaic of crystal elements of the said crystalline substance and the sides of the said crystal elements where they adjoin one another are coated with an opaque substance.

12. An image converter as claimed in claim 8 and wherein the said plate is a single crystal of the said crystalline substance.

13. An image converter as claimed in claim 3 and wherein the crystalline substance contains one atomic percent to fifteen atomic percent of holmium.

14. An image converter as claimed in claim 13 and wherein the said plate comprises a bundle of light pipes or light fibres of the said crystalline substance.

15. An image converter as caimed in claim 13 and wherein there is provided a separate source of pump radiation for irradiating the plate.

16. An image converter as claimed in claim 13 and wherein the said plate comprises a mosaic of crystal elements of the said crystalline substance.

17. An image converter as claimed in claim 13 and wherein the said plate comprises a mosaic of crystal elements of the said crystalline substance and the sides of the said crystal elements where they adjoin one another are coated with an opaque substance.

18. An image converter as claimed in claim 13 and wherein the said plate is a single crystal of the said crystalline substance.

19. An image converter comprising a plate made from a crystalline substance consisting of a host lattice of one of the fluorides, lanthanum fluoride, calcuim fluoride, strontium fluoride and barium fluoride containing 0.1 atomic percent to 30 atomic percent of one of the rare earth elements erbium and holmium in the triply ionised state, a source of pump radiation and a mirror for reflecting the pump radiation and for transmitting visible radiation and located to reflect the said pump radiation into the said plate.

20. An image converter as claimed in claim 19 and wherein the concentration of rare earth element in said host lattice is in the range extending from one atomic percent to fifteen atomic percent inclusive.

21. A method of optical frequency conversion comprising irradiating with light a crystal composed of a host lattice of one of the fluorides, lanthanum fluoride, calcium fluoride, strontium fluoride and barium fluoride containing one-half atomic percent to thirty atomic percent of one of the rare earth elements dysprosium, praseodymium, terbium, neodymium, erbium, and holmium in the triply ionized state, said light being composed of light of a first frequency which raises the energy of the electrons of the rare earth element to a higher energy level than the ground level and light of a second frequency which raises the energy of said electrons to a still higher energy level from which the energy of said electrons falls with the emission of visible light.

22. A method of optical frequency changing as claimed in claim 21 wherein the said light of the first frequency and the said light of the second frequency are derived from different sources.

23. A method of optical frequency changing as claimed in claim 21 wherein said one of the rare earth elements is taken from the group erbium and holmium.

24. A method of optical frequency changing as claimed in claim 23 wherein the concentration of said one of the rare earth elements is one atomic percent to fifteen atomic percent.

References Cited

UNITED STATES PATENTS

| | | | |
|---|---|---|---|
| 3,062,959 | 11/1962 | Sclar | 331—94.5 |
| 3,062,962 | 11/1962 | McGee | 250—213 |
| 3,070,698 | 12/1962 | Bloembergen | 331—94.5 |
| 3,130,254 | 4/1964 | Sorokin et al. | 252—301.4 X |
| 3,142,760 | 7/1964 | Iams | 250—213 |
| 3,203,899 | 8/1965 | Fisher | 252—301.4 X |
| 3,219,585 | 11/1965 | Kaiser | 252—301.4 X |
| 3,231,746 | 1/1966 | Goodrich | 250—213 |
| 3,258,715 | 6/1966 | Johnson | 331—94.5 |
| 3,258,716 | 6/1966 | Nassau et al. | 331—94.5 |

RALPH G. NILSON, *Primary Examiner.*

M. A. LEAVITT, *Assistant Examiner.*